United States Patent [19]

Duran

[11] Patent Number: 5,036,289
[45] Date of Patent: Jul. 30, 1991

[54] METHOD AND APPARATUS FOR SYNCHRONOUSLY DEMODULATING DETECTOR OUTPUT OF A RADIOMETER

[75] Inventor: Andrew J. Duran, Stamford, Conn.

[73] Assignee: Infrared Systems, Inc., Orlando, Fla.

[21] Appl. No.: 326,808

[22] Filed: Mar. 17, 1989

[51] Int. Cl.$^5$ .............................................. H03K 5/22
[52] U.S. Cl. .................................... 328/117; 328/151;
328/155; 307/311; 329/313; 329/360; 329/361
[58] Field of Search ................... 328/26, 32, 117, 127,
328/151, 155; 307/352, 353, 311; 329/313, 360,
361

[56] References Cited

U.S. PATENT DOCUMENTS

| | | | |
|---|---|---|---|
| 3,445,663 | 5/1969 | Jones et al. | 329/313 |
| 3,845,400 | 10/1974 | Yee | 328/117 |
| 4,692,890 | 9/1987 | Arseneau | 328/127 |
| 4,698,523 | 10/1987 | Gershon et al. | 328/151 |
| 4,716,373 | 12/1987 | Schulze | 328/127 |

Primary Examiner—Timothy P. Callahan
Attorney, Agent, or Firm—Parmelee, Bollinger & Bramblett

[57] ABSTRACT

An infrared detector output of a radiometer is amplified and inverted to provide a first signal which is amplified to a predetermined level and a second signal which is inverted with respect to the first signal and amplified to a fraction of the predetermined level of the first signal. The first and second signals are alternately sampled to sample portions of those signals which occur when the detector of the radiometer is viewing the target and then viewing the reference. The signals are sampled once while the detector of the radiometer is looking at the target and twice occurring on each side of the target sample when the detector is looking at the reference signal. The first and second signals are separately integrated in accordance with a predetermined timing pattern determined by the sampling rate of the first (target) and second (reference) signals. The peak integrated outputs of the first and second signals are held then sampled to produce the demodulated output from the radiometer. The integrating circuit is then dumped during the time of the second target view of the detector, to restart the integrating cycles which permits integrating every other signal which appears on the detector through the radiation chopper of the radiometer. With the addition of a second integrator circuit which is alternately phased with the first in respect to clear and target timing, every signal which appears on the detector is integrated and sampled with no retention. Complete views of the target are provided for every opening and there is no recall of any previous signal providing full band width for the chopper of the radiometer. This type of synchronous demodulation provides an improvement in noise characteristics over previous full wave rectified radiometer output methods.

10 Claims, 3 Drawing Sheets

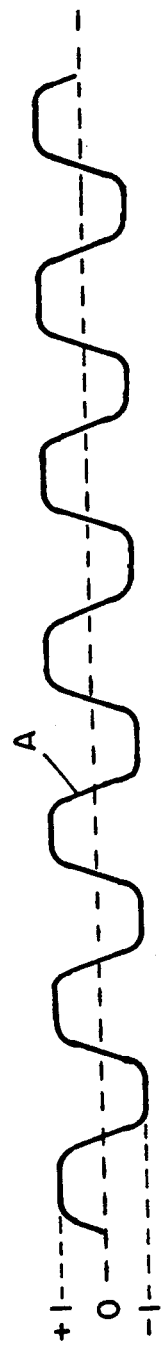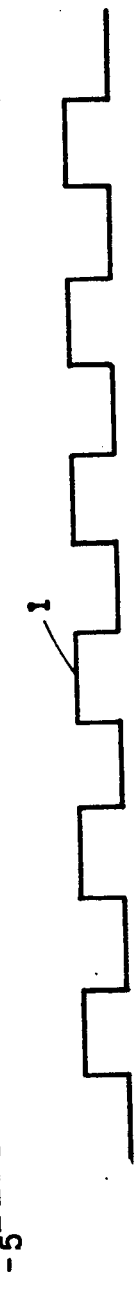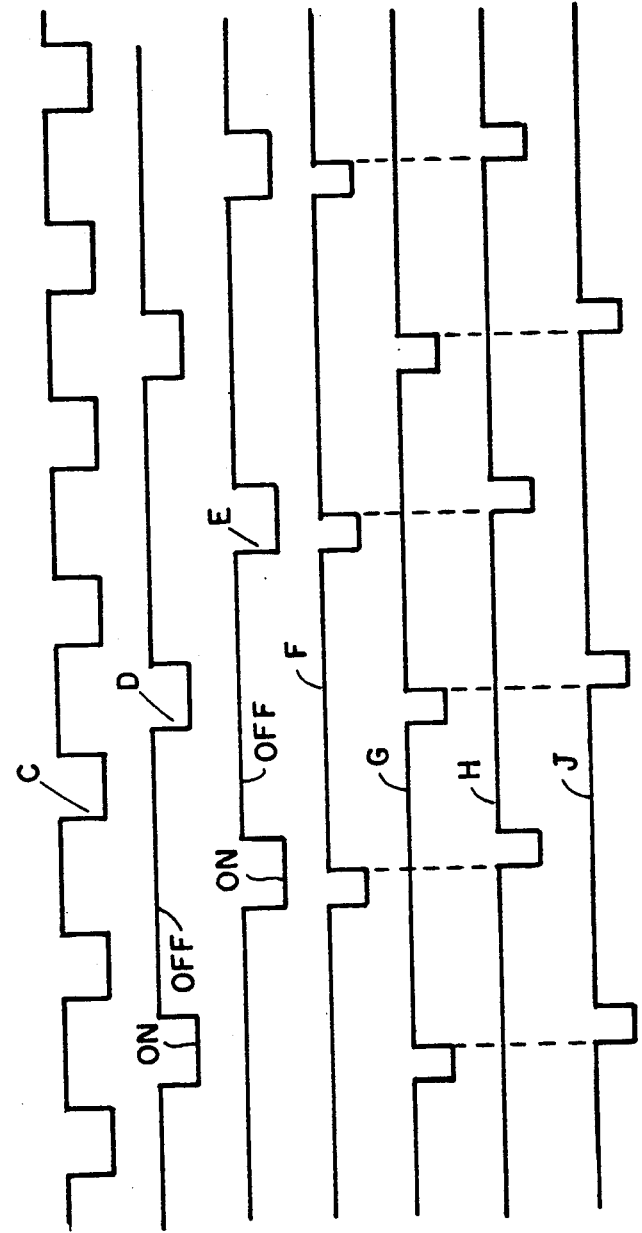

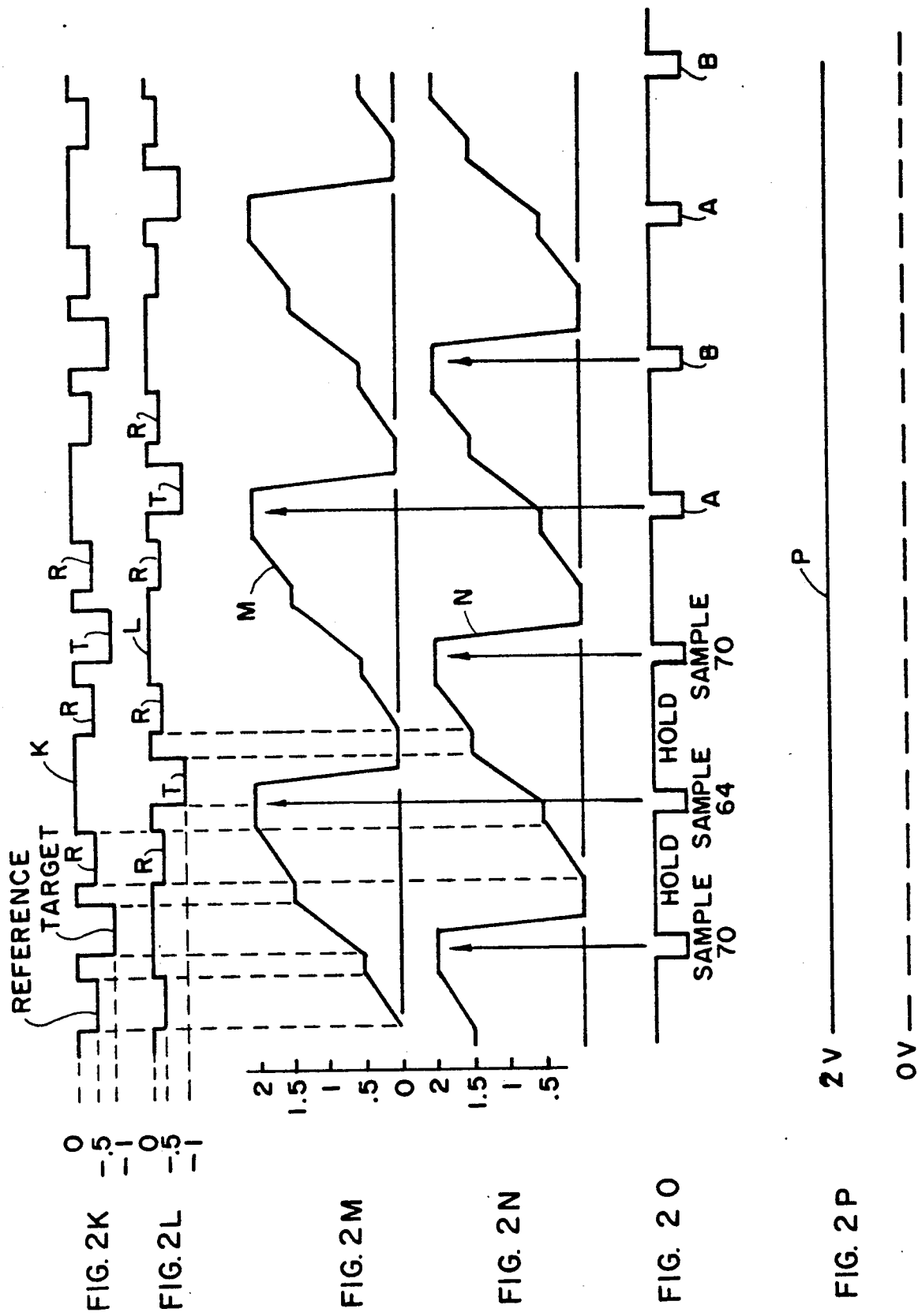

5,036,289

METHOD AND APPARATUS FOR SYNCHRONOUSLY DEMODULATING DETECTOR OUTPUT OF A RADIOMETER

FIELD OF INVENTION

This invention relates to a method and apparatus for synchronously demodulating the infrared detector output of an infrared radiometer or any other similar synchronous AC signals.

BACKGROUND OF INVENTION

Radiometers receive infrared radiation from sources in their fields of view and transform the received radiation into electrical signals which can be measured and recorded without physical contact with the target sources being measured. A basic radiometer includes an optical system, a chopper, detector, a reference source, a synchronizing signal generator, and an electronic processing system. The optical system may take many forms but is frequently a mirror telescope consisting of concave primary and convex secondary mirrors with the focusing usually accomplished by moving the secondary mirror along the optical axis. An infrared detector is located at the focal point of the optical system to receive and convert the infrared radiation into a detector signal. A black body radiation reference source is used as a standard against which the target radiation is continuously compared. An optical chopper, for example, in the form of a mirror surface, sector-disc-shutter is driven by a motor and rotates in front of the reference source. The detector alternately senses target radiation as the rotating disc is opened and closed, and the detector output comprises an alternating signal, the peak-to-peak voltage of which is precisely proportional to the difference between the target radiation and the known radiation from the black body reference source. A synchronizing signal generator develops a square wave signal which drives a phase sensitive demodulator in the electronic processing system. As the blades of the optical chopper rotate, the synchronizing signal generator generates a square wave signal of exactly the same frequency as the detector output signal and the synchronizing signal can be moved so as to adjust the phase of the output.

An amplifier located close to the detector amplifies the detector output signal and generally speaking a synchronous rectifier is used driven by the synchronizing signal generator which demodulates the amplifier output producing a DC signal exactly proportional to the difference between the radiation from the target and the known radiation from the reference black body source. The polarity of the demodulated output signal indicates whether the target is hotter or colder than the reference source. Since variations in the output signal are precisely proportional to variations in the target temperature, the DC signal generated by the radiometer can be connected to a control system for the real time scanning of spectral targets and/or temperature monitoring or control of other devices or electronic circuits based on the temperature of the target.

Conventional full wave rectified signals contain a large amount of ripple which must be heavily filtered to reduce demodulation noise, generally cutting system frequency response down to one quarter of the input signal frequency. Also, when the target radiation is small, large variations in noise can produce errors and in some cases can actually swamp out the signals desired to be detected. The problem is caused by the synchronous demodulation technique in which the switching circuit filters provide a lag between readings and are not achieving the full band width of the optical chopper.

SUMMARY OF THE INVENTION

Accordingly, it is an object of this invention to provide a new and improved method and apparatus for synchronously demodulating an infrared detector output from a radiometer or any other synchronous AC signal, which is full band width and less noisy than prior full wave synchronous demodulating techniques for such instruments.

Still another object of this invention is to provide a new and improved synchronous demodulator for a radiometer which individually views the target through each open segment of a radiation chopper without retaining a residuary from previous target looks thereby providing full band width for the chopper signal.

Another object of this invention is to provide a new and improved method and apparatus for synchronously demodulating the infrared detector output of a radiometer which has a phase-lock-loop which provides timing flexibility.

In carrying out this invention in one illustrative embodiment thereof output from an instrument having a chopper is synchronously demodulated by amplifying and inverting the analog output from the detector for providing a first signal which is amplified to a predetermined level and a second signal which is inverted with respect to the first signal and amplified to a fraction of the predetermined level of the first signal. The first and second signals are separately sampled and alternately integrated in accordance with a predetermined timing pattern determined by the alternate sampling rate of the first and second signals in which the target sample is surrounded by two reference samples. The peak integrated output of the first and second integrator circuits are alternately sampled, held and combined for producing a demodulated output from the instrument. The first and second signals are in effect multiplexed and each integrator is alternately dumped when the detector is viewing the target.

BRIEF DESCRIPTION OF THE DRAWINGS

The invention, together with further objects, aspects, features and advantages thereof will be more clearly understood from the following description taken in connection with the accompanying drawings.

FIGS. 2A through 2P represent a series of wave forms which appear at various points in FIG. 1 and are useful in explaining the operation of the synchronous demodulator embodied in the present invention.

DESCRIPTION OF THE PREFERRED EMBODIMENTS

Figure 1:
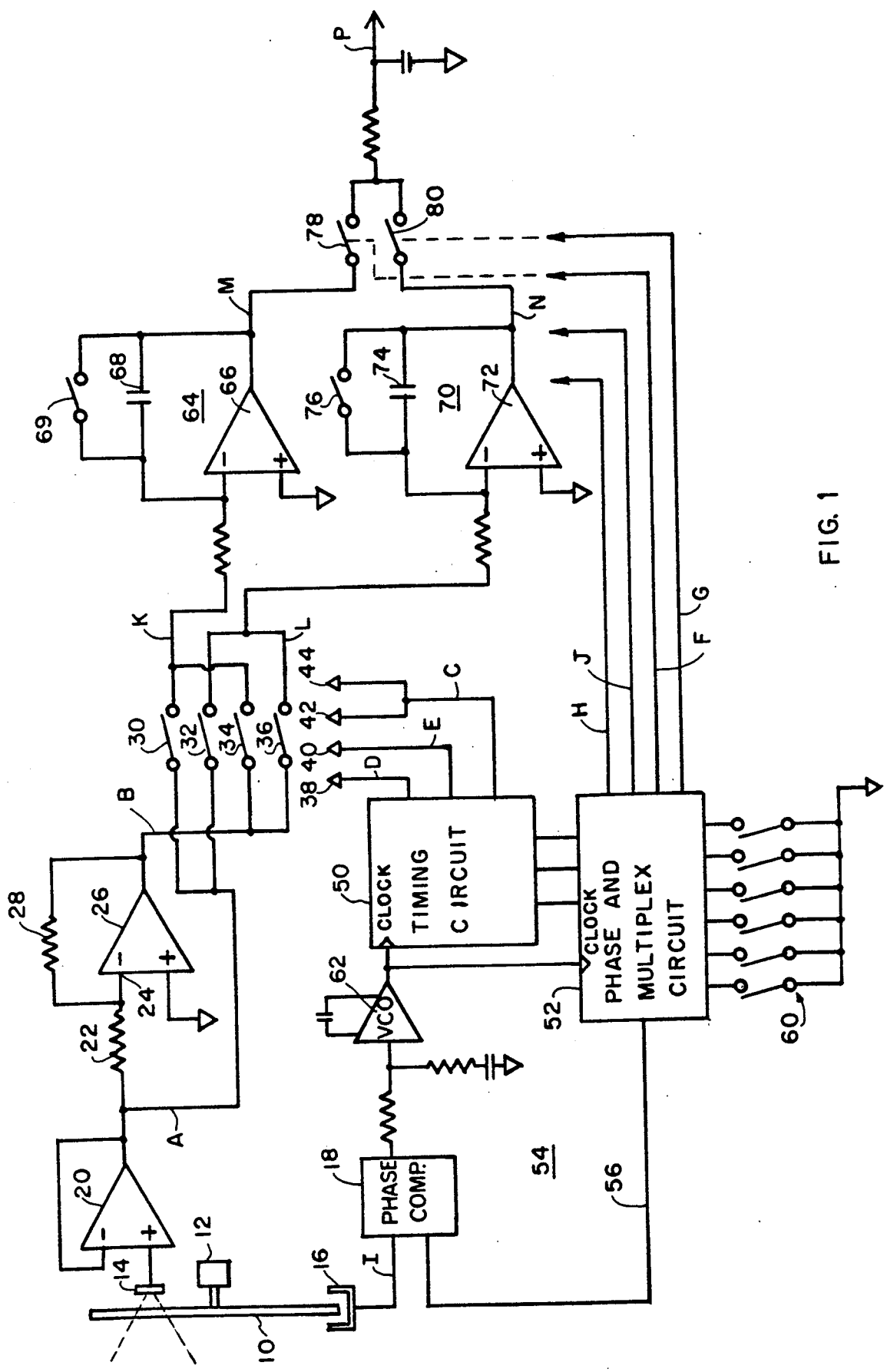
FIG. 1 is a simplified electrical schematic diagram partly in block form of the synchronous demodulator embodied in the present invention.

Referring now to FIG. 1, an optical chopper or shutter 10 is driven by a motor 12 and rotates in front of an infrared detector 14. The optical system as well as the black body radiation reference source which is used as a standard against which target radiation is continuously compared are not shown for ease of illustration since their specific structure is not specifically involved in the present invention. A synchronizing signal generator 16 develops a square wave signal I illustrated in FIG. 2I which is applied to a phase comparator 18. The signal generator 16 may be magnetic or photoelectric and as the blades of the optical chopper rotate the signal generator 16 generates a square wave signal of exactly the same frequency as the output signal of the detector 14.

The output signal of the detector 14 is applied to a preamplifier 20 providing a waveform A which is illustrated in FIG. 2A. Waveform A is also applied through a resistor 22 to the negative terminal 24 of a preamplifier 26 having a feedback resistor 28 which in effect amplifies the output of preamplifier 26 to a fraction of the amplitude of waveform A with an inversion providing an output from the preamplifier 26 of waveform B as illustrated in FIG. 2B. In the examples chosen for purpose of illustration, waveform B is the inverse of waveform A and an amplitude of $-\frac{1}{2}$. The output of the amplifiers 20 and 26 in the form of waveform A and waveform B are supplied to a bank of switches 30, 32, 34 and 36 which are controlled by activators 38, 40, 42 and 44. The activators 38-44 may be in any suitable form such as semiconductor activated switches. The control for the activators 38-44 are provided by a timing circuit 50.

The timing circuit 50 along with phase and multiplex circuit 52 are part of a phase-locked-synchronous-loop 54 which in effect provides the timing required based on the chopper's speed provided by the waveform I which is applied to the phase comparator 18 along with the adjusted phase from the phase and multiplex circuit 52. A plurality of switches 60 connected to the phase and multiplex circuit 52 provides a number of divisions of the 100× chop speed clock to delay the phase comparator input signal, and permits the adjustment of the phase of the signal timing. The output of the phase comparator 18 is applied to a voltage controlled oscillator 62 which multiplies the chop speed by 100. The timing circuit 50 and the phase and multiplex circuit 52 may be in the form of programmable logic devices (PLD), for example, EP900 or EP1800 made by Altera Corporation. The phase-locked-loop 5 provides timing delay and a phase adjustment for the chopper/signal lag compensation. The circuit provides all of the necessary timing functions for the synchronous demodulator of the present invention.

The bank of switches 30, 32, 34 and 36 connect waveforms A and B in a prescribed manner to integrator 64 having an amplifier 66, a charging capacitor 68 and a switch 69 coupled across the capacitor 68 while integrator 70 includes an amplifier 72, a charging capacitor 74 and its associated switch 76. A pair of output switches 78 and 80 are connected to the outputs of integrators 64 and 70, respectively, providing an output P corresponding to waveform P of FIG. 2P.

In operation waveform C from the timing circuit 50 operates switch activators 42 and 44 to operate switches 34 and 36, respectively, in accordance with waveform C in FIG. 2C to charge both integrators 64 and 70 on their capacitors 68 and 74, respectively, to 0.5 volts illustrated in waveforms K and L which are applied respectively, to the inputs of integrators 64 and 70, respectively. Accordingly, both integrators see the same reference signal. As will be seen from waveforms M and N from FIGS. 2M and 2N respectively, both integrators A and B will progressively charge as the target and reference signal are alternatively processed by the radiometer. It will appear from waveforms K, L, M and N that each of the waveforms A and B applied with the timing illustrated to integrators 64 and 70, respectively, will each look at the reference twice and look at the signal only once which cuts the noise. There is no lag between readings and the system integrates every target signal. As will be seen in FIGS. 2C, D and E, the waveforms C, D and E provide the switch control for applying waveforms A and B to the integrators 64 and 70, respectively.

Demodulation is obtained by multiplexing the output of the integrators by sampling and holding maximum levels in each integrated waveform. As will be seen in FIGS. 2F and 2G, sample timing windows for integrators 64 and 70, respectively, are illustrated by waveforms F and G derived from phase and multiplex circuit 52 with waveform F controlling switch 78 and waveform G controlling switch 80. Waveforms H and J as illustrated in FIGS. 2H and 2J, control switches 69 and 76, respectively, for clearing and in effect resetting the integrators 64 and 70, respectively thus, storing no charge from any previous signal. The combination of integrators 64 and 70 are multiplexed and shown combined in FIG. 2O which results in waveform P of FIG. 2P which is the demodulated output voltage of the synchronous demodulator of the present invention.

The present synchronous demodulator has many advantages over conventional full wave rectifier circuits for producing a DC output signal exactly proportional to the difference between the radiation from the target and the known radiation from a reference. The benefit lies in being able to not only phase adjust and provide any delay in chopper response but also to take a complete look at every opening in the chopper and integrating every signal received by the detector with no retention, no delay, and at full band width. Accordingly, once the integrator is dumped, no recall is provided from any previous signal which permits the full band width of the chopper without having to recover each time the chopper opens and closes. A valid reading is comprised of one stable target scene plus two stable chops with the sample rate of change being the chop rate, for example, 1 KHz. The phase synchronous loop 54 thus operates at 100 KHz to provide the timing signals illustrated in the waveforms of FIG. 2. In the example illustrated, one full target and one full reference would amount to a time interval of 1 millisecond with a dwell on target and on reference being 0.5 milliseconds. The integrators are each on approximately 300 microseconds and the sample timing window for the integrators is approximately 150 microseconds in the timing circuits illustrated in the waveforms. The specific examples illustrated have been chosen for purposes of illustration and are not considered limiting of the present invention which primarily takes one look at the target and two at the reference during the activation of each integrator with the integrator output being derived by sampling the maximum level reached on the integrator which is held until the sample from the next integrator is taken, and after the samples have been taken the integrators are cleared for the next cycles. This is believed to restrict the noise which will be particularly critical if the signal levels to be detected are relatively small and must be distinguished and not swamped out by noise.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of synchronously demodulating a detector analog output signal from an instrument having a chopper wherein said detector analog output signal is derived from alternately viewing a target and a reference for providing a target portion and a reference portion of said detector analog output signal comprising the steps of:

amplifying and inverting the analog output from said detector of said instrument for providing a first signal amplified to a predetermined level and a second signal which is inverted with respect to said first signal and amplified to a fraction of the predetermined level of a first signal;

alternately integrating said first and second signals in accordance with a predetermined timing pattern determined by the alternate integrating rate of said first and second signals for providing peak integrated outputs from each of said first and second signals;

separately sampling, holding, and alternately combining each of said peak integrated outputs of said first and second signals for producing a demodulated output from the instrument.

2. The method as claimed in claim 1 wherein said alternately integrating step comprises integrating said first and second signals by sampling the target portion of said signals once and the reference portion of said signals twice during the integration of each of said first and second signals.

3. The method as claimed in claim 2 wherein following the sampling and holding of the peak integrated output of said first and second signals the integrator is reset for the next sampling and integration steps.

4. A synchronous demodulator for demodulating the output of a detector derived by alternately viewing a target and a radiation reference source via a radiation chopper comprising;

a first amplifier coupled to said detector for providing an amplified first signal;

a second amplifier coupled to said detector for inverting and amplifying said detector output providing a second signal having an amplitude which is a fraction of the amplitude of said first signal;

synchronizing signal generating means coupled to said radiation chopper for generating a synchronizing signal;

a timing circuit having said synchronizing signal applied thereto;

first and second integrating circuits;

switch means coupled between said first and second amplifiers and said first and second integrators, respectively;

switch control means coupled between said timing circuit and said switch means;

means in said timing circuit for generating sampling control signals from said timing circuit which are applied to said switch control means for selectively applying said first and second signals to said first and second integrators; and means connected to said first and second integrators for combining the outputs of said first and second integrators thereby providing a full wave demodulated DC output signal from said synchronous demodulator.

5. The synchronous demodulator as claimed in claim 4 in which said synchronizing signal generating means and said timing circuit are connected in a phase locked synchronous loop.

6. The synchronous demodulator as claimed in claim 5 wherein said phase locked synchronous loop has a plurality of phase adjustment means coupled thereto for selectively varying the phase of the synchronizing signal.

7. The synchronous demodulator as claimed in claim 6 wherein said phase locked synchronous loop has means for increasing the synchronizing timing speed 100 times.

8. The synchronous demodulator as claimed in claim 4 in which said sampling control signal as applied to said first and second integrators respectively, is in a reference-target-reference clear pattern for the first integrator and reference-clear-reference-target-reference-pattern for the second integrator.

9. The synchronous demodulator as claimed in claim 8 wherein sampling means are provided for additional sampling the peak amplitudes and holding the peak amplitude levels of said peak signals when combined.

10. The synchronous demodulator as claimed in claim 9 having means to discharge said integrator after the peak levels have been reached and sampled.

* * * * *